United States Patent [19]

Maeda et al.

[11] 4,391,743
[45] Jul. 5, 1983

[54] COMPOSITION FOR DEPOSITING METALLIC OXIDE FILM COATINGS

[75] Inventors: Umio Maeda, Fukuoka; Hirofumi Shoji, Toyama; Yasusuke Wada, Johanamachi; Yoshio Horie, Nakago, all of Japan

[73] Assignee: Nippon Soda Company Limited, Tokyo, Japan

[21] Appl. No.: 325,648

[22] Filed: Nov. 30, 1981

[51] Int. Cl.$^3$ .............................................. H01B 1/06
[52] U.S. Cl. ................................... 252/518; 252/500; 427/108
[58] Field of Search .............................. 252/518, 500; 106/286.8, 286.19, 286.26, 1.05; 427/108, 126.1, 126.2, 126.3, 162, 169, 226

[56] References Cited

U.S. PATENT DOCUMENTS

| | | | |
|---|---|---|---|
| 2,617,742 | 11/1952 | Olson | 252/518 |
| 3,400,288 | 9/1968 | Groth | 427/110 |
| 3,666,534 | 5/1972 | Groth et al. | 427/110 |
| 4,000,346 | 12/1976 | Dowell | 427/110 |
| 4,147,556 | 4/1979 | Donley | 106/287.19 |
| 4,268,539 | 5/1981 | Nokayama et al. | 252/518 X |
| 4,303,554 | 12/1981 | Sudo et al. | 252/518 |

Primary Examiner—J. L. Barr
Attorney, Agent, or Firm—George B. Oujevolk

[57] ABSTRACT

An organic solution of a composition consisting essentially of 100 parts of an indium compound represented by the formula $$In(X)_l(Y)_m$$

wherein X denotes a chelate ring formed by β-diketones, esters of β-ketoacids or the like, Y denotes an alkoxide formed by aliphatic alcohols or the like, and l and m denote an integer which is either 1 or 2 having the relationship of l+m=3, and from 5 to 20 parts of a tin compound represented by the formula $$Sn(X')_2 \text{ or } Sn(Y')_{m'}$$

wherein X' denotes a chelate ring formed by β-diketones or esters of β-ketoacids, Y' denotes an alkoxide formed by aliphatic alcohols, and m' denotes 2 or 4, is suitable for deposition of transparent, hardened and low resistivity film coatings of tin-doped indium oxide on a substrate by dipcoating.

1 Claim, No Drawings

COMPOSITION FOR DEPOSITING METALLIC OXIDE FILM COATINGS

The present invention relates to a composition for the deposition of metallic oxide film coatings, and more particularly, to a composition suitable for depositing a tin-doped indium oxide film of transparent, hardened and low electrical resistivity coating on a substrate by means of the dip-coating method.

Thin film coatings of indium oxide on substrates such as glass have heretofore been obtained by vacuum deposition, but the process often proves too costly for industrial application. The spraying of solutions containing an indium compound on a heated substrate is recommended for this purpose, however, the process requires complicated equipment and techniques. In order to deposit thin film coatings of indium oxide on a substrate having a large surface area, the dip-coating method seems to be the most desirous process from the industrial point of view. An organic solution containing such indium compounds as indium acetylacetonate and indium alkoxides may be suitable for the spraying method, however, indium alkoxides tend to hydrolyze during coating or during the evaporation of the solvent if the dip-coating method is employed, and the hazy hydrolyzed compound coated on the substrate results in the deposition of opaque film coatings of indium oxide. As for indium acetoacetonate, though it does not hydrolyze during coating of the solution or during evaporation of the solvent, indium oxide film coatings obtained by the dip-coating method are not satisfactorily transparent due to streaks on the coatings which appear during the baking.

It is, therefore, an object of this invention to provide a composition suitable for depositing transparent film coatings composed mainly of indium oxide on an substrate by means of dip-coating.

It is another object of this invention to provide for the deposition of an indium oxide film coating which has low electrical resistivity.

The composition of the present invention comprises 100 parts of an indium compound represented by the formula (I)

$$In(X)_l(Y)_m \quad\quad (I)$$

wherein

X denotes a chelate ring formed by β-diketones, lower alkyl esters of β-ketoacids, α-hydroxyacids or alkanolamines, Y denotes an alkoxide formed by aliphatic alcohols, alkylene glycols or lower alkyl mono-ethers of alkylene glycols, and l and m denote 1 or 2 having the relationship of l+m=3;

and from 5 to 20 parts of a tin compound represented by the formula (II)

$$Sn(X')_2 \text{ or } Sn(Y')_{m'} \quad\quad (II)$$

wherein

X' denotes a chelate ring formed by β-diketones or lower alkyl esters of β-ketoacids, Y' denotes an alkoxide formed by aliphatic alcohols, and m' denotes 2 or 4, and the composition is suitable for deposition of transparent, hardened and low resistivity film coatings of tin-doped indium oxide on a substrate by means of the dip-coating method.

Indium coatings represented by the formula (I) are characterized by possessing $(X)_l$ and $(Y)_m$ in the molecule, and preferable X and Y are as follows:

X: a chelate ring formed by acetylacetone, methyl or ether ester of acetoacetic acid, lactic acid and triethanolamine, and Y: an alkoxide formed by butyl alcohol, octyl alcohol, octylene glycol and monomethylether of ethylene glycol.

The indium compound possessing two chelate rings formed by methyl acetoacetoate and one n-butoxide may be prepared, for example, by reacting indium chloride ($InCl_3$) dissolved in an inert organic solvent such as n-hexane with two times the mole equivalent of methyl acetoacetoate and an excessive amount of n-butyl alcohol in the presence of an acid-binding agent such as triethylamine. The compound obtained may be indicated by the following structural formula

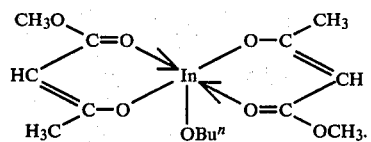

The indium compounds are not necessarily pure compounds, but they may be mixtures of compounds represented by the formula (I).

For tin compounds represented by the formula (II) which possess X' or Y' in the molecule, preferable X' and Y' are as follows:

X': a chelate ring formed by acetylacetone and methyl acetoacetoate, and

Y': an alkoxide formed by butyl alcohol and octyl alcohol.

The tin compounds are not necessarily pure compounds, but they may be mixtures of compounds represented by the formula (II).

For the purpose of the present invention, the compositions are use in the form of an organic solution. In order to obtain a solution not hydrolyzed during coating of the solution or during evaporation of the organic solvent from the coated solution, the indium compound must be accompanied by the tin compound in the amount of from 5 to 20 parts of the tin compound per 100 parts of the indium compound.

Organic solvents employed for preparing organic solutions of the composition are not specifically limited, however, in consideration of easiness of evaporation of the solvent from the coated solution, aliphatic alcohols and esters of aliphatic acids having boiling points of below about 180° C. and their mixtures are usually employed. And among them, aliphatic alcohols having less than 5 carbon atoms and acetic acid esters are preferably used.

Organic solutions containing the composition are prepared under ordinary conditions, and concentration of the component in the solution is usually settled at from 1 to 50 weight percent.

The application of organic solutions onto a substrate is carried out by dip-coating including such methods as by dipping a substrate into solution and withdrawing at a predetermined rate, by immersing a substrate into the solution and pumping out or withdrawing the solution, and by rotating a substrate and applying a desired amount of the solution to the substrate during rotation so as to make the centrifugal force spread the solution over the substrate.

The thickness of the resultant coatings may be controlled by varying the concentration of the component in the solution, by varying the rate of withdrawal of the substrate from the solution, or by varying the speed of the rotation of a substrate.

The solution coated on a substrate is not affected by atmospheric moisture until the solution has been concentrated by the evaporation of the solvent from the coated solution when drying the substrate. The drying is usually carried out at from 50° to 100° C. for from 10 minutes to 3 hours, and thin clear layer of the component is left on surface of the substrate. The component is stable until such time as the evaporation is completed, and this is one of the main distinctions of the present invention over the prior art.

As explained above, since the composition is stable during drying of the solution coated on a substrate, the composition is especially suitable for applying the solution onto a substrate by the methods previously mentioned. It is to be understood that the solution is also applicable in such film-depositing methods employing the spraying and the airosol process, though they may include little changes of causing hydrolysis of the component by atmospheric moisture.

A substrate coated with a thin layer of the component is baked under such conditions as at from 300° to 800° C. for from 10 minutes to 2 hours. Metallic oxides film coatings deposited on the substrate after baking are hard and transparent tin-doped indium oxide, and the coatings possess low electrical resistivity. Accordingly, the film coatings obtained according to the present invention are useful in the fields of optics, electronics and solar energy.

EXAMPLES

Solutions containing the component were prepared in accordance with the description mentioned in Table 1. An alkaliglass plate having the dimensions of 70×30×1 mm was dipped in the solution, and the glass plate was withdrawn at a rate of 20 cm/minute. The glass plate coated with the solution was dried at 60° C. for 30 minutes to vaporize the solvent. The dried coated glass plate was baked at 500° C. for 30 minutes. Thin film coatings deposited on the glass plate were hard and transparent, and the thickness and sheet resistance are shown in Table 2.

TABLE 1

| | $In(X)_l(Y)_m$ | | | | | $Sn(X')_2$ or $Sn(Y')_{m'}$ | | | | Solution of component | |
|---|---|---|---|---|---|---|---|---|---|---|---|
| Composition No. | Compound with which X is formed | Compound with which Y is formed | l | m | Parts | Compound with which X' is formed | Compound with which Y' is formed | m' | Parts | Solvent | Parts |
| 1 | AA | n-BuOH | 2 | 1 | 10 | | n-BuOH | 4 | 1 | EtAc | 90 |
| 2 | AA | i-OcOH | 2 | 1 | 10 | | i-OcOH | 4 | 1 | EtAc | 90 |
| 3 | AA | i-OcOH | 1 | 2 | 10 | | n-BuOH | 4 | 1 | EtAc | 90 |
| 4 | AA | OcG | 2 | 1 | 10 | | n-BuOH | 4 | 1 | EtOH | 90 |
| 5 | AA | EGMeE | 2 | 1 | 10 | | n-BuOH | 4 | 1 | EtOH | 90 |
| 6 | EAA | n-BuOH | 2 | 1 | 10 | | n-BuOH | 4 | 1 | EtOH | 90 |
| 7 | MAA | n-BuOH | 2 | 1 | 10 | | i-OcOH | 4 | 1 | EtOH | 90 |
| 8 | MAA | n-BuOH | 1 | 2 | 10 | | n-BuOH | 4 | 1 | EtOH | 90 |
| 9 | MAA | i-OcOH | 2 | 1 | 10 | | n-BuOH | 4 | 1 | EtOH | 90 |
| 10 | LA | n-BuOH | 2 | 1 | 10 | | n-BuOH | 4 | 1 | MeOH | 90 |
| 11 | TEA | n-BuOH | 2 | 1 | 10 | | n-BuOH | 4 | 1 | EtOH | 90 |
| 12 | MAA | n-BuOH | 2 | 1 | 10 | | n-BuOH | 2 | 1 | EtAc | 90 |
| 13 | MAA | n-BuOH | 2 | 1 | 10 | MAA | | | 1 | EtAc | 90 |
| 14 | MAA | n-BuOH | 2 | 1 | 10 | | t-BuOH | 4 | 1 | EtAc | 90 |
| 15 | MAA | n-BuOH | 2 | 1 | 10 | | t-BuOH | 4 | 1.5 | EtAc | 90 |
| 16 | MAA | n-BuOH | 2 | 1 | 10 | | t-BuOH | 4 | 0.5 | EtAc | 90 |
| 17 | MAA | n-BuOH | 2 | 1 | 10 | MAA | | | 1 | EtAc | 40 |
| 18 | MAA | n-BuOH | 2 | 1 | 10 | MAA | | | 1 | $CH_2Cl_2$ | 40 |
| 19 | AA | n-BuOH | 2 | 1 | 10 | AA | | | 1 | $CHCl_3$ | 90 |
| 20 | MAA | i-OcOH | 2 | 1 | 10 | MAA | | | 1 | EtAc | 90 |
| 21 | MAA | n-BuOH | 2 | 1 | 10 | MAA | | | 2 | EtAc | 90 |

(Remarks)
AA: acetylacetone; EAA: ethyl acetoacetoate; MAA: methyl acetoacetoate; LA: lactic acid; TEA: triethanolamine; OcG: octylene glycol; EGMeE: mono-methylether of ethylene glycol
BuOH: butyl alcohol; OcOH: octyl alcohol; EtAc: ethyl acetate

TABLE 2

| Composition No. with which film coating was deposited | Thickness (Å) | Sheet Resistance (K ohm/□) |
|---|---|---|
| 1 | 300 | 20 |
| 2 | 350 | 15 |
| 3 | 300 | 35 |
| 4 | 300 | 30 |
| 5 | 350 | 20 |
| 6 | 450 | 5 |
| 7 | 400 | 7 |
| 8 | 400 | 10 |
| 9 | 350 | 15 |
| 10 | 300 | 40 |
| 11 | 300 | 25 |
| 12 | 400 | 7 |
| 13 | 500 | 6 |
| 14 | 400 | 8 |
| 15 | 350 | 10 |
| 16 | 300 | 15 |
| 17 | 1000 | 2 |
| 18 | 1300 | 1.3 |
| 19 | 800 | 3 |
| 20 | 300 | 15 |
| 21 | 300 | 20 |

We claim:
1. A composition to be dissolved in an organic solvent and applied onto a substrate to deposit a metallic oxide film coating on the substrate, said composition consisting essentially of 100 parts of an indium compound represented by the formula $$In(X)_l(Y)_m$$

wherein, for said indium compound X denotes a chelate ring material selected from the group consisting of acetylacetone, methyl or ethyl ester of acetoacetic acid, lactic acid, triethanolamine, and mixtures thereof; Y denotes an alkoxide material selected from the group consisting of butyl alcohol, octyl alcohol, octylene glycol, mono-methylether of ethylene glycol, and mixtures thereof; l and m are an integer which is 1 or 2 having the relationship of $l+m=3$; said indium compound being one component of the composition, the other component being from 5 to 20 parts of a tin compound represented by the formula $$Sn(X')_2 \text{ or } Sn(Y')_{m'}$$

wherein, for said tin compound X' denotes a chelate ring material selected from the group consisting of acetylacetone, methyl acetoacetoate, and mixtures thereof; Y' denotes an alkoxide material selected from the group consisting of butyl alcohol, oxtyl alcohol, and mixtures thereof; and m' is an integer which is 2 or 4.

* * * * *